United States Patent [19]
Oosaka et al.

[11] 3,999,010
[45] Dec. 21, 1976

[54] LIGHT BEAM SCANNING SYSTEM

[75] Inventors: Shigenori Oosaka; Masahiro Ohnishi, both of Asaka, Japan

[73] Assignee: Fuji Photo Film Co., Ltd., Minami-ashigara, Japan

[22] Filed: Oct. 16, 1975

[21] Appl. No.: 623,263

[30] Foreign Application Priority Data

Oct. 18, 1974 Japan .............................. 49-120478

[52] U.S. Cl. ............................. 358/302; 346/76 L; 358/285
[51] Int. Cl.² ......................................... H04N 5/84
[58] Field of Search ..................... 178/6.7 R, 7.6; 346/76 L

[56] References Cited
UNITED STATES PATENTS
3,922,714   11/1975   Delarie ............................... 178/7.6

Primary Examiner—Thomas B. Habecker

[57] ABSTRACT

In a laser beam scanning system for recording information on a recording material employing a rotating mirror, a photodetector is provided to receive a laser beam in the start position of rasters. The photodetector supplies a synchronizing signal for making a synchronization between the laser beam scanning and a video signal supplied to a light modulator to modulate the laser beam. The frequency of base clock pulses is several times as large as that of the video clock pulses, whereby the start positions of the effective rasters on the recording material are aligned with each other.

4 Claims, 6 Drawing Figures

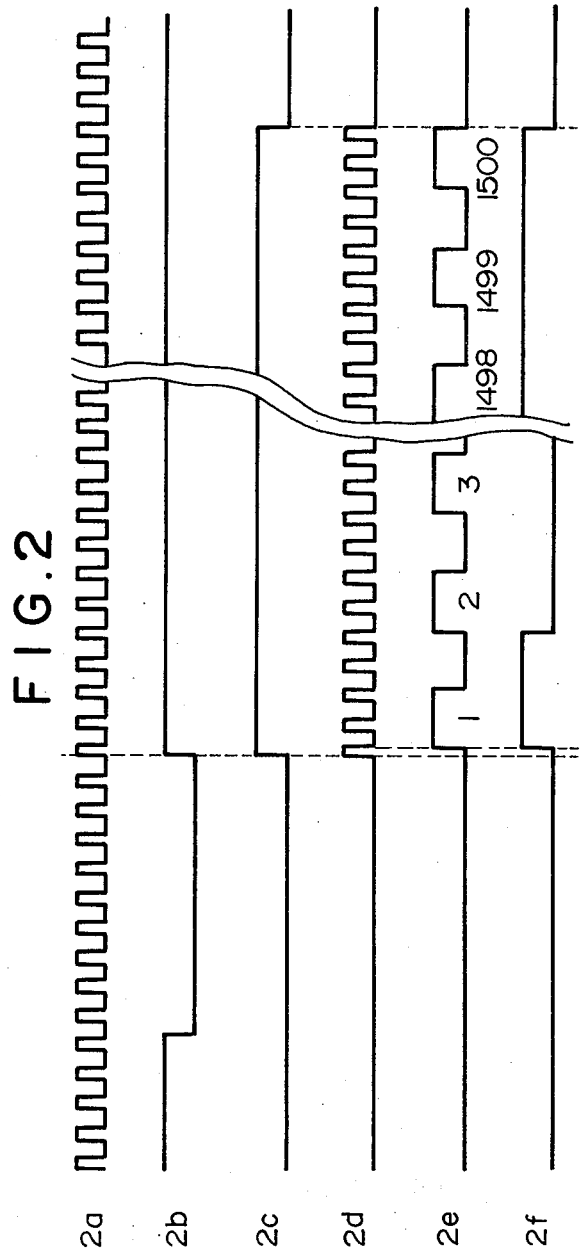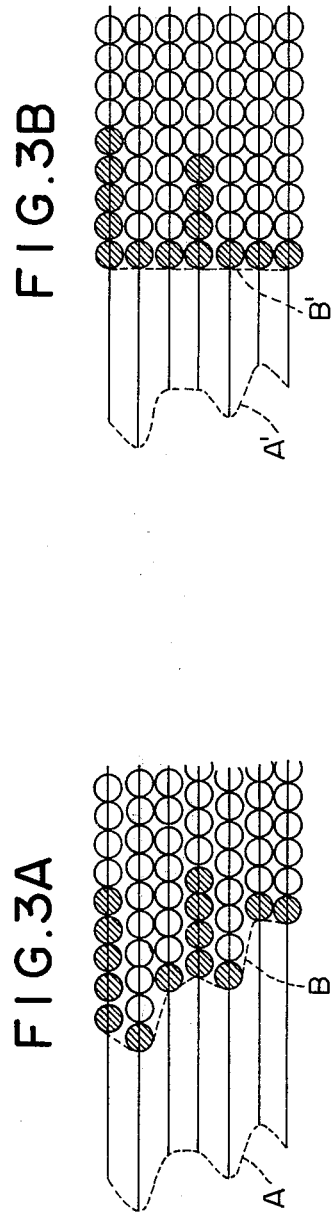

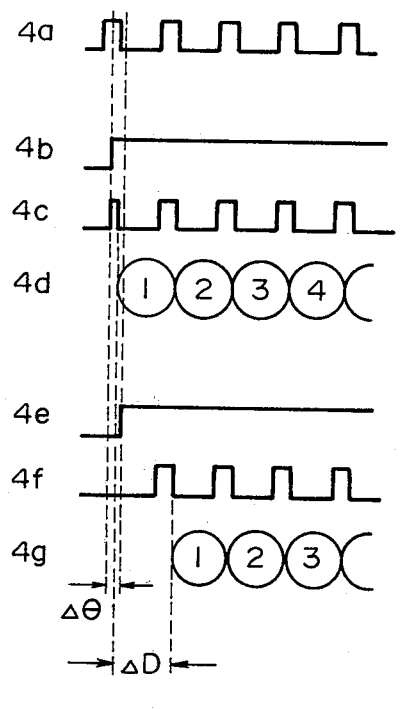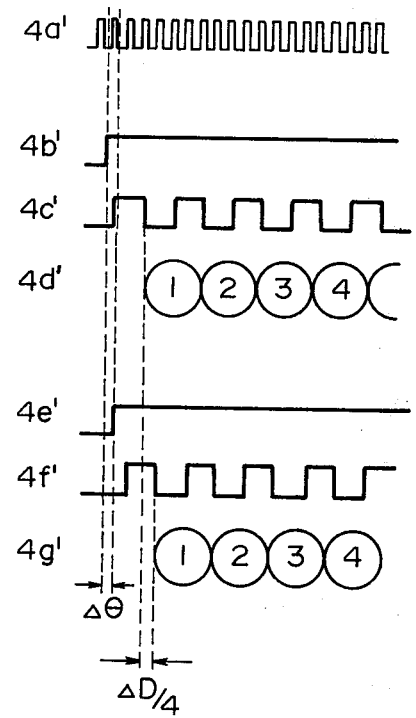

LIGHT BEAM SCANNING SYSTEM

BACKGROUND OF THE INVENTION

1. Field of the Invention

This invention relates to a light beam scanning system, and more particularly to an improvement in a light beam scanning system for recording information employing a rotating mirror as a beam deflector.

2. Description of the Prior Art

In light beam scanning systems employing a laser beam, various beam deflectors are used for making rasters, such as light beam deflectors utilizing an electro-optical effect or acoustooptical effect, vibrating mirrors of galvanometer type and rotating polygonal mirrors. The rotating mirrors are advantageous in that a large angle of deflection can be obtained, a high resolution of image can be effected and it does not have a spectroscopic effect. However, rotating mirrors have a defect in that the start positions of the rasters are liable to fluctuate due to the errors in manufacturing of the rotating mirrors and/or the fluctuation in the speed of rotation of the motor used for driving the rotating mirrors.

In order to manufacture rotating mirrors having highly accurately cut facets, considerably high technique of manufacture is required. Further, such rotating mirrors become extraordinarily expensive. In order to prevent the fluctuation in the speed of rotation of a motor, a high performance expensive motor must be used together with a complicated feed-back control.

It has been known in the art to eliminate the jitter in the direction of rasters in light beam scanning systems without increasing the accuracy in the manufacturing of the rotating mirrors or eliminating the fluctuation in the speed of rotation of a motor. In Laser Focus issued Jan. 1, 1966 p.9–12, a laser television camera system developed by Parkin Elmer is disclosed. In this system, an information read-out device employs a rotating mirror and a photodetector located in the vicinity of the starting point of rasters formed by the rotating mirror. The output signal of the photodetector is used as a synchronizing signal to operate a display device such as a cathode ray tube. This system disclosed in Laser Focus has a defect in that the quality of image is not sufficient when the rotation of the rotating mirror is not synchronized with the video clock signal.

SUMMARY OF THE INVENTION

The primary object of the present invention is to provide a light beam scanning system in which the jitter in the direction of rasters is eliminated without increasing the accuracy in manufacturing of a rotating mirror or eliminating the fluctuation in the speed of rotation of a motor.

Another object of the present invention is to provide a light beam scanning system employing a rotating mirror which is able to record images of high quality even when the rotation of the rotating mirror is not synchronized with the video clock signal.

The light beam scanning system in accordance with the present invention employs a photodetector located at the start position of rasters formed by a rotating mirror and the output of the photodetector is used as a synchronizing signal. Base clock pulses having a frequency of $n$ times as large as that of the video clock pulses are generated at the end of the synchronizing signal, and video clock pulses are generated in accordance with the base clock pulses, whereby the start positions of the rasters are aligned on a recording material. As the photodetector can be used a photomultiplier or an avalanche diode.

BRIEF DESCRIPTION OF THE DRAWING

FIG. 2 shows waveforms of various signals employed in the system as shown in FIG. 1, FIGS. 3A and 3B are enlarged views showing the dots recorded on a recording material, in which FIG. 3A shows the arrangement of dots according to the prior art and FIG. 3B shows the corrected arrangement of dots according to the present invention, and FIGS. 4A and 4B are enlarged explanatory views for explaining the disalignment and alignment of the start position of the rasters, in which FIG. 4A shows the disalignment of the start positions in case where the frequency of the base clock signal is the same as that of the video clock signal and FIG. 4B shows the disalignment (substantial alignment) of the start positions of the rasters in case where the frequency of the base clock signal is four times as large as that of the video clock signal.

DESCRIPTION OF THE PREFERRED EMBODIMENT

Figure 1:
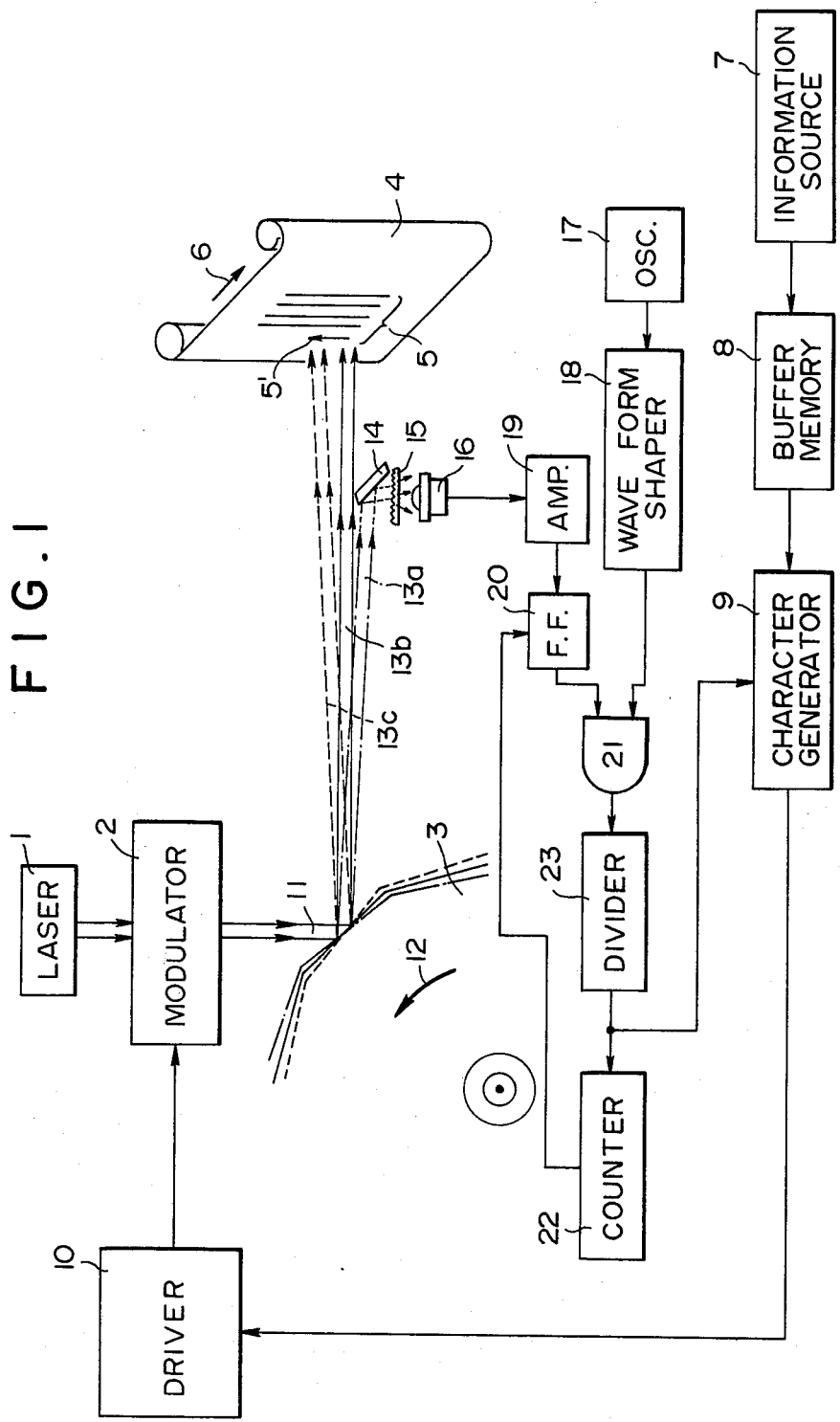
FIG. 1 is a diagram which shows a computer output printing system in which an embodiment of the laser beam scanning system in accordance with the present invention is employed.

An embodiment of the present invention employed in a system for printing the output of a computer is illustrated schematically in FIG. 1 in which a laser beam scans a photosensitive material to record the computer output information thereon. Referring to FIG. 1, a laser beam is generated from a laser source 1 and amplitude modulated through a light modulator 2. The modulated laser beam 11 is deflected in one direction by a rotating mirror 3 rotated in one direction as indicated by an arrow 12 and scans a photosensitive material 4 to form rasters 5 thereon. The photosensitive material 4 is fed in the direction as shown by an arrow 6 to make a two-dimensional scanning thereon. By modulating the laser beam, information such as characters and numerals can be recorded on the photosensitive material 4. Code signals from an information source 7 such as a computer are put into a buffer memory 8 to be memorized thereby and then are read out at a different speed from that at which the signals are memorized thereby. The read out signals are put into a character generator 9 which generates character signals according to video clock signals supplied thereto. The character signals are transmitted to a driver 10 for driving said light modulator 2 and amplified therethrough to drive said light modulator 2 and modulate the laser beam.

The light beam scanning system as described above is provided with a means for eliminating the jitter in rasters in accordance with the present invention as described hereinbelow. The laser beam 11 modulated by the modulator 2 is deflected by the facets of the rotating mirror 3 and directed to the photosensitive material 4 to scan the same as indicated by the reference numerals 13a, 13b and 13c. The direction of scanning is indicated by the numeral 5'. A photodetecting means comprising a mirror 14 located in the optical path of the laser beam deflected by the rotating mirror 3 to reflect the laser beam 13a directed to the start position of rasters 5, a light diffusion plate 15 to diffuse the light reflected by the mirror 14 and a photodetector 16 located behind the light diffusion plate 15 to detect the light reflected by the mirror 14. The other laser beams 13b and 13c impinge upon the photosensitive material 4. Therefore, the start portion of the rasters 5 formed on the photosensitive material 4 is cut out by the photodetecting means and the starting positions of rasters are all aligned with each other even if there are errors in the angle of facets of the rotating mirror 3 or there is a fluctuation in the speed of rotation of the motor to drive the rotating mirror 3. Accordingly, the jitter in the rasters can be eliminated if the video signal, i.e. said character signal is generated immediately or a predetermined time after the laser beam passed the photodetecting means.

The video signal is generated in accordance with the synchronizing signal from the photodetecting means as described hereinbelow. Base clock pulses are generated from a quartz oscillator 17, the frequency of the base clock pulses being $n$ times ($n$ is a positive integral number.) as large as the frequency of the video clock pulses. The base clock pulses from the oscillator 17 are shaped through a wave form shaping circuit 18. An amplifier 19 is connected with said photodetector 16 to amplify the output therefrom. A flip-flop circuit 20 is connected with the amplifier 19. The flip-flop circuit 20 is energized by the rise of the output wave from the amplifier 19 and is reset when reset signal is supplied thereto from a counter 22 which counts the number of video clock pulses (corresponding to the number of dots) in an effective raster. For instance, when 150 characters are recorded in a horizontal line where one character consists of ten dots lined horizontally, the reset signal is generated from the counter when 1500 video clock pulses are counted by the counter 22. Said wave form shaping circuit 18 and the flip-flop circuit 20 are connected with an AND circuit 21 so that the base clock pulses from the wave form shaping circuit 18 are allowed to transmit through the AND circuit 21 in accordance with the output of the flip-flop circuit 20. The output of the AND circuit 21 is transmitted to a divider 23 and is divided into a signal having a frequency of $1/n$ of the frequency of the base clock pulses. Thus, divided video clock pulses are obtained and sent to the character generator 9 and the counter 22. The counter 22 resets said flip-flop circuit 20 when a predetermined number of the video clock pulses are counted as mentioned above.

FIG. 2 shows the wave form of various signals employed in the above described light beam scanning system. The abscissa represents time and the ordinate represents voltage.

Referring to FIG. 2, the signal 2a is the output of the wave form shaping circuit 18 the frequency of which is four times as large as that of the video clock signal in this embodiment. The signal 2b is the output of the amplifier 19 the low level part of which indicates that the photodetector 16 receives the laser beam. The signal 2c is the output of the flip-flop circuit 20 which indicates that the level is raised upon the rise of the output signal 2b from the amplifier 19. The signal 2d is the output of the AND circuit 21 which indicates that the base clock pulses 2a are transmitted through the AND circuit 21 only when the level of the output 2c of the flip-flop 20 is high. The signal 2e is the output of the divider 23 the frequency of which is divided to ¼ of the base clock pulses 2a and is sent to the character generator 9 and the counter 22 as a video clock signal. The numerals indicated in the video clock pulses 2e are numbers of the video clock signal in each raster. The signal 2f is the output of the character generator 9 serving as a video signal which is made by the character generator 9 in accordance with the video clock pulses 2e and the code signal supplied from the buffer memory 8.

As described hereinabove, by providing a photodetecting means in the optical path of a laser beam in the start portion of the rasters, it becomes possible to have a video clock pulses be generated immediately after or simultaneously with the passing of the laser beam through the photodetecting means and accordingly to have a video signal be generated. Therefore, the effective rasters 5 on the photosensitive material 4 always start from the same position determined by the mirror 14 and the start positions of rasters 5 are aligned with each other.

The effect of the alignment of the start positions of rasters will be described with reference to FIGS. 3A and 3B. The hatched dots show the presence of the video signal and the white dots show the absence thereof. In FIGS. 3A and 3B, a character F is recorded by horizontally lined 5 dots and vertically lined 7 dots. FIG. 3A shows the rasters the start positions of which are disaligned from each other and accordingly the shape of the character recorded by which is deformed. The broken line A indicates the locus of the start positions of rasters and the broken line B indicates the locus of the start positions of the effective rasters on the photosensitive material 4. The disalignment of the start positions is mainly caused by the errors in manufacture of the rotating mirror. FIG. 3B shows the rasters the start positions of which are disaligned but the start positions of the effective rasters on the photosensitive material 4 are aligned with each other. The shape of the character recorded is not deformed. Thus, the jitter in the direction of rasters is markedly eliminated in accordance with the present invention.

The reason for the alignment of the start positions of the rasters effected by the present invention in which base clock pulses have a frequency of $n$ times as large as that of the video clock pulses will hereinbelow be explained with reference to FIGS. 4A and 4B. Since the time from the start of the raster to the start of the effective raster of one raster is different from that of another, the phase difference between the base clock pulses and the rise of the output of the flip-flop circuit of one raster is also different from that of another. Therefore, if the base clock pulses are used also as the video clock pulses, a time lag of one period of the base clock pulses will occur at maximum which corresponds to disalignment of the start positions by one dot. This is shown in FIG. 4A in which the abscissa indicates the time. The signal 4a is the base clock pulse, 4b is the output of the flip-flop circuit which rises upon passing of the laser beam through the photodetecting means, 4c is the video clock pulse, and circles at 4d are indicative of the dots on the raster. The signal 4e is the output of the flip-flop circuit for another raster, 4f is the video clock pulse and 4f shows the dots also in said another raster. There is a phase difference of $\Delta\theta$ between the output 4b of the flip-flop for one raster and that of another. Since the video clock pulses for the first raster become as shown in 4c, the dots for this raster are formed as shown in 4d with the first dot being formed immediately after the rise of the flip-flop output 4b. Owing to the phase difference of $\Delta\theta$, the video clock pulses for the second raster become as shown in 4f in which the first video clock pulse is delayed by ΔD from the first video clock pulse in the clock pulses 4c for the first raster. Therefore, the dots for the second raster are formed as shown in 4g with the first dot being formed immediately after the delayed video clock pulse. Thus, there is a delay of ΔD between the start of the dot formation in the first raster and that in the second raster as shown in FIG. 4A, which delay corresponds to the time for forming one dot in the raster.

FIG. 4B shows the relation between the dot formation in one raster and that in another obtained in accordance with the present invention, in which the frequency of the base clock pulses is made four times as large as that of the video clock pulses. As shown in FIG. 4B which shows the signals pertaining to the dot formation in the similar way to FIG. 4A, the phase difference between the two flip-flop outputs is Δθ which is equal to said phase difference in the example shown in FIG. 4A. The delay of the start of the video clock pulse 4f' for the second raster from that for the first raster 4c' is ΔD/4 because the video clock pulses are made in accordance with the base clock pulses having a frequency of four times as large as that of the video clock pulses in this case. The delay of the start of the video clock pulse for the second raster from that for the first raster is determined by the period of the base clock pulses. The shorter is the period, i.e. the higher is the frequency of the base clock pulses, the smaller is the delay. Thus, in accordance with the present invention, the delay of the dot formation in the second raster from that in the first raster is decreased and the jitter in the rasters is eliminated.

From the practical viewpoint, the disalignment of the start positions of the effective rasters is desired to be not more than a fourth of the diameter of the dot, but is not required to be less than a tenth thereof. Therefore, the frequency of the base clock pulses should preferably be as not less than four times and not more than ten times as large as that of the video clock pulses.

We claim:

1. A light beam scanning system comprising a laser beam source for generating a laser beam, a light modulator provided in the optical path of the laser beam for modulating the laser beam in accordance with a video signal supplied thereto, a rotating mirror for deflecting the laser beam incident thereon in one direction, a photodetecting means provided in the optical path of the laser beam deflected by said rotating mirror at an end of the deflection to receive the laser beam and generate a synchronizing signal, means for supplying a video signal to said light modulator, and means for supplying a video clock pulse to said video signal supplying means upon receipt of said synchronizing signal wherein the improvement comprising means for generating a base clock pulse the frequency of which is a plurality times as large as that of said video clock pulse, said base clock pulse being supplied to said video clock pulse supplying means for making the latter supply the video clock pulse.

2. A light beam scanning system as defined in claim 1 wherein the frequency of said base clock pulse is not less than four times as large as that of the video clock pulse.

3. A light beam scanning system as defined in claim 2 wherein the frequency of said base clock pulse is not more than ten times as large as that of the video clock pulse.

4. A light beam scanning system as defined in claim 1 wherein said means for supplying a video clock pulse to said video signal supplying means comprises a flip-flop circuit connected with said photodetecting means, an AND circuit connected with said flip-flop circuit for receiving the output of the flip-flop circuit, said AND circuit being connected with said means for generating a base clock pulse for receiving the base clock pulses together with said output of the flip-flop circuit, and a divider connected with the output of the AND circuit for dividing the output from the AND circuit and supplying the same to said video signal supplying means as a video clock pulse.

* * * * *